United States Patent [19]
Betke

[11] 3,743,908
[45] July 3, 1973

[54] FIRING CONTROL CIRCUIT FOR GRID-CONTROLLED SWITCHING DEVICES

[75] Inventor: Adolf C. Betke, Greenfield, Wis.

[73] Assignee: The Louis Allis Company, Milwaukee, Wis.

[22] Filed: Sept. 7, 1972

[21] Appl. No.: 286,930

[52] U.S. Cl................................. 318/345, 321/13
[51] Int. Cl. ........................................ H02p 5/16
[58] Field of Search ................ 321/11, 13; 318/227, 318/331, 345

[56] References Cited
UNITED STATES PATENTS
3,538,412  11/1970  Graf..................................... 318/345
3,551,781  12/1970  Smith................................... 318/345
3,671,836  6/1972  Kolatorowicz..................... 318/345

Primary Examiner—Bernard A. Gilheany
Assistant Examiner—Thomas Langer
Attorney—Alan C. Rose, Harold E. Gillmann et al.

[57] ABSTRACT

A circuit having a grid-controlled rectifying means with a selectively variable firing angle, having a logic circuit for generating firing pulses including a first firing pulse at a predetermined firing angle, and having an inhibitor circuit for monitoring the state of conduction in the grid-controlled rectifying means. The inhibitor circuit enables the logic circuit whenever the rectifying means is not in conduction and disables the logic circuit at predetermined amount of time after each firing pulse generated by the logic circuit.

5 Claims, 5 Drawing Figures

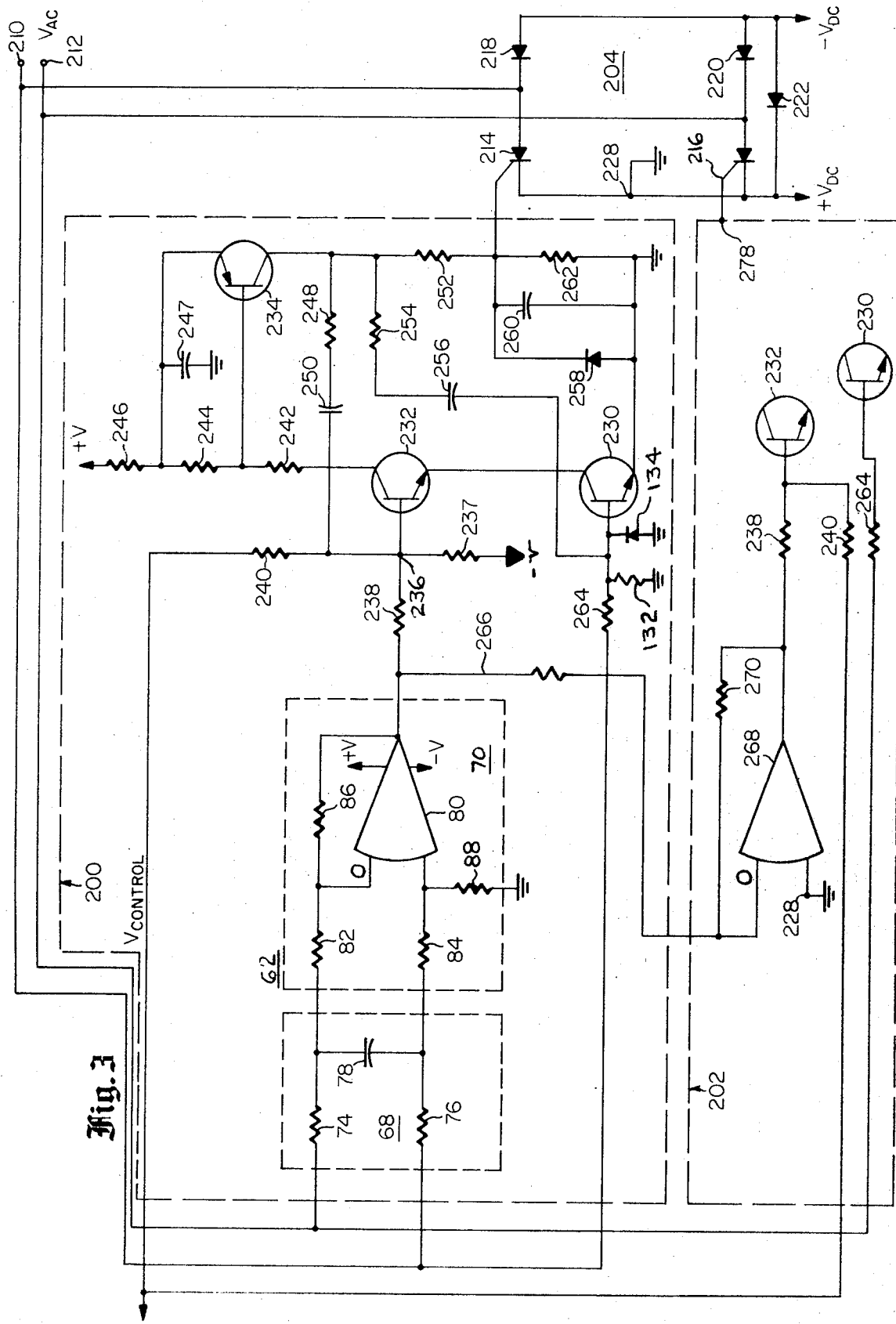

FIRING CONTROL CIRCUIT FOR GRID-CONTROLLED SWITCHING DEVICES

CROSS-REFERENCE TO A RELATED APPLICATION

This application is related to an application entitled "A Circuit for Shifting the Phase of a Sine Wave by Differential Means" Ser. No. 286,957, Sept. 7, 1972 filed by the same inventor.

BACKGROUND OF THE INVENTION

In controlled circuits of the prior art, particularly in those used to control conduction in grid-controlled rectifying devices, such as thyristors and thyratrons, a firing pulse is generated at a predetermined firing angle in the period of each cycle of an AC input voltage. The duty cycle, i.e., the ratio of conduction time of the grid-controlled rectifying device during each cycle of an AC input voltage, is a function of the variable firing angle. Normally only one firing pulse is needed in each cycle. However, if a disturbance such as a notch occurs in the AC input voltage applied to the grid-controlled rectifying device, the rectifying device may cease to conduct during that portion of the cycle when conduction is desired. Of course, variation in the load condition on the rectifying device could also cause an undesired end to the period of conduction.

If conduction in the grid-controlled rectifying device does cease at an undersired time, the device must be gated back into conduction. Some circuits for firing grid-controlled rectifying devices, such as thyristors and thyratrons, at variable firing angles have dealt with this problem by supplying multiple firing pulses, known as "burst firing," to each rectifying device during each cycle of the AC input voltage. Utilization of burst firing means that the rectifying device can only be out of conduction due to a line or load distrubance until the next firing pulse. However, utilization of burst firing is subject to the disadvantage that the required circuitry is relatively complex and costly.

SUMMARY OF THE INVENTION

The invention disclosed herein overcomes the above noted disadvantage of the prior art by providing switching circuits having at least one grid-controlled rectifying means. The inhibitor circuit enables the logic circuit the rectifying means during each cycle of an AC input voltage, and an inhibitor circuit for monitoring the state of conduction in the rectifying means. The logic circuit is phase-referenced to the AC input signal and is adapted to generate firing pulses at a selectively variable firing angle of each cycle of the AC input voltage. The firing pulses are coupled to the gate of the rectifying means. The inhibitor circuit enables the logic circuit whenever the rectifying means is out of conduction and disables the logic circuit beginning a predetermined time from each firing of the rectifying means. The logic circuit generates a subsequent gating pulse after the first gating pulse in each cycle at the predetermined firing angle whenever the logic circuit is enabled by the inhibitor circuit. A subsequent firing pulse is generated only in the event that the rectifying means ceases to conduct during the portion of each cycle predetermined for conduction.

It is, therefore, an object of the invention to provide a control circuit for firing a grid-controlled switching means at a predetermined firing angle in each cycle of an AC input voltage and, which subsequently, responds to the ceasing of conduction of the rectifying device during the remaining portion of the cycle predetermined for conduction.

DESCRIPTION OF THE DRAWINGS

FIG. 3 is a schematic diagram showing the invention utilized in a single-phase, half-controlled AC to DC bridge converter.

DESCRIPTION OF THE PREFERRED EMBODIMENT

Figure 1A:
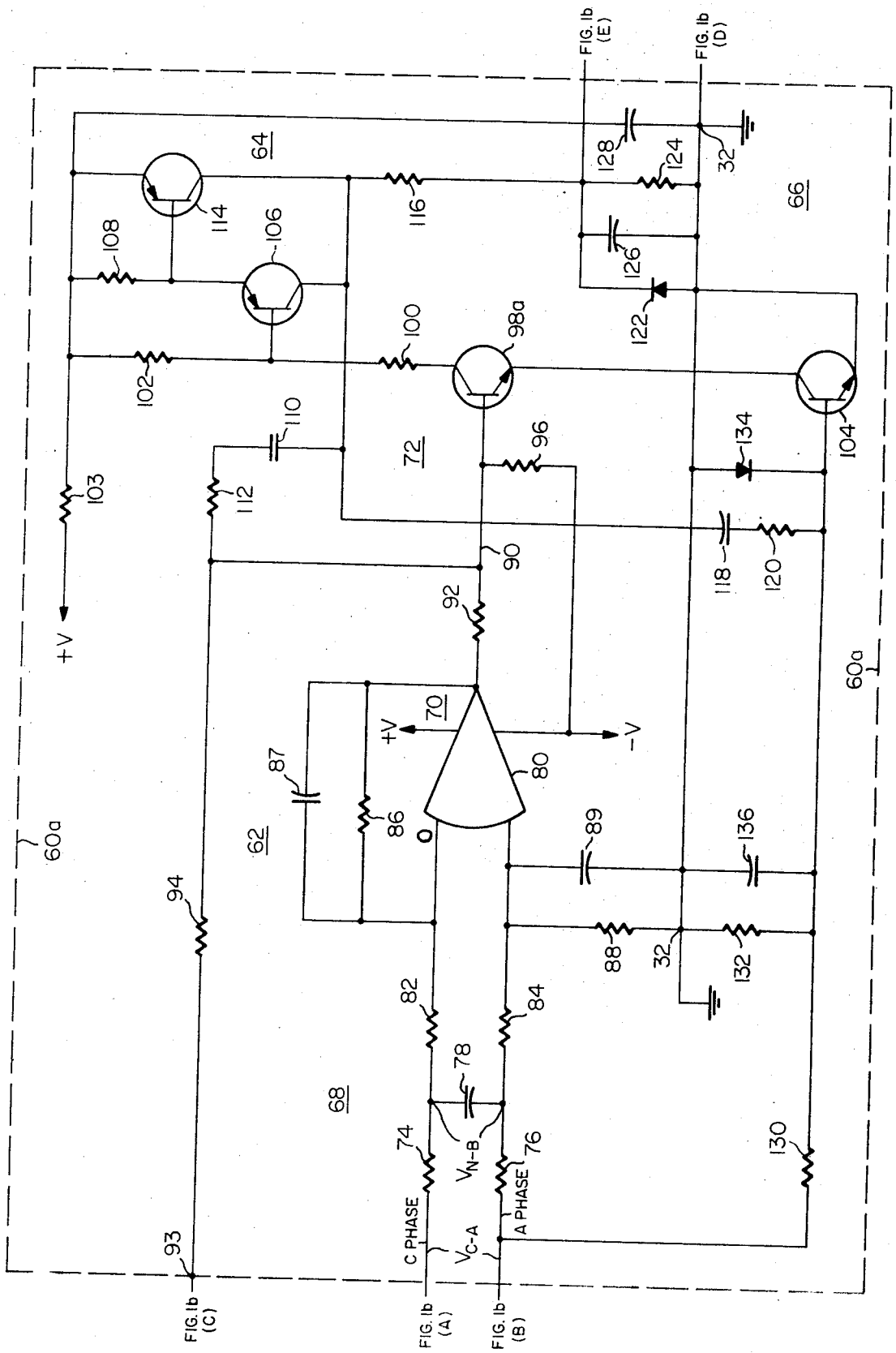
FIG. 1 is a schematic diagram of the invention utilized in a three-phase, half-controlled bridge AC to DC converter.
Figure 1B:
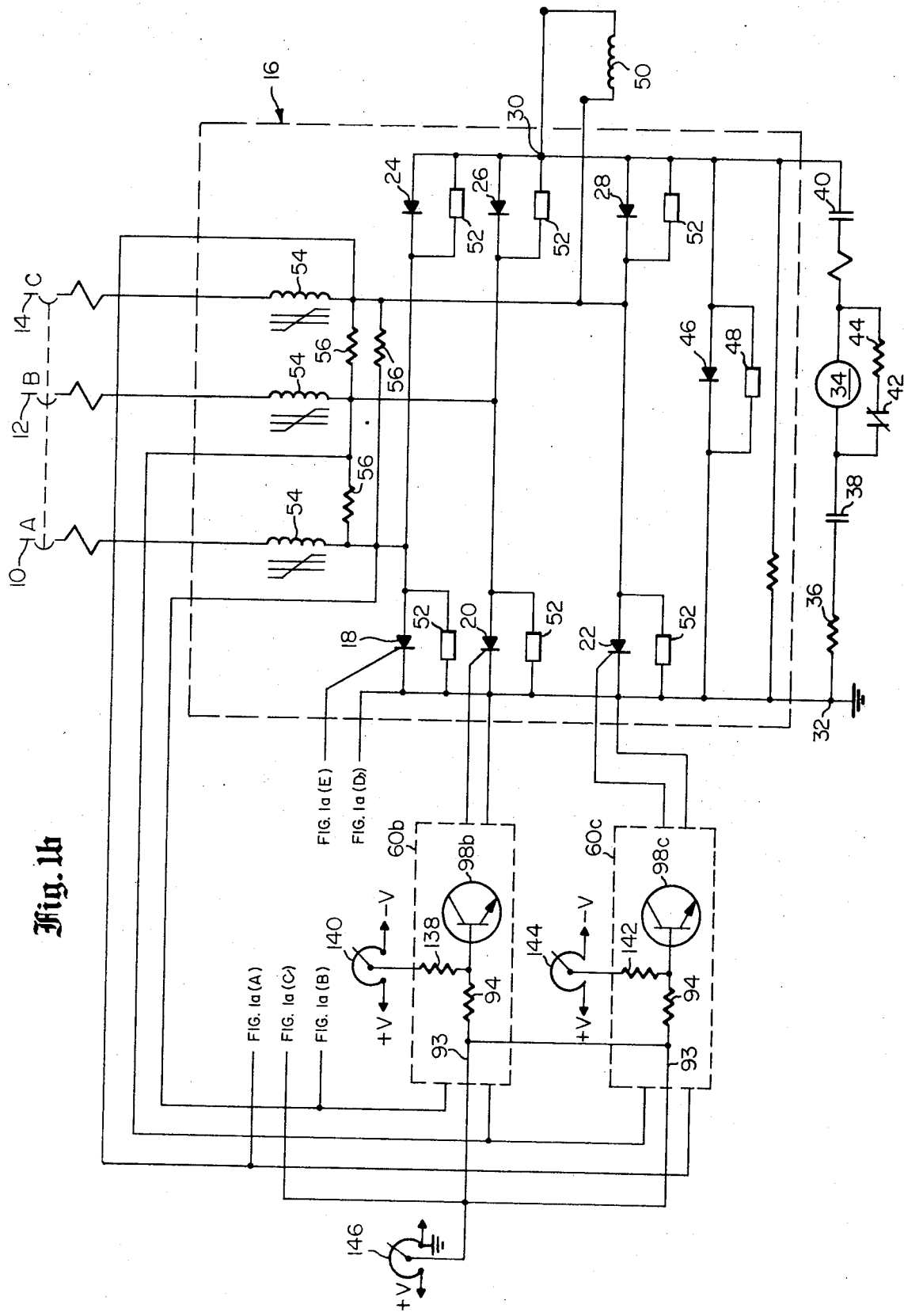

In FIG. 1 there is shown the control circuit of the invention utilized to control the DC output voltage of the three-phase, half-control thyristor bridge rectifier circuit. Half-controlled, three-phase thyristor bridges are well known in the art and will not be discussed in detail herein. However, the principles of the invention may be utilized to control thyristors connected in other kinds of circuits, such as a full-control bridge, or other switching circuits utilizing grid-controlled rectifiers and such as thyratrons and other devices having selectively variable duty cycles.

Switching circuits utilizing thyristors as controlled rectifiers can produce an average DC output voltage which is a function of the firing angle and the maximum DC output voltage. Thyristors are grid-controlled devices which require a minimum voltage and/or current to be triggered into conduction and which may be used as rectifiers. The trigger pulse or voltage may be applied at any time during a half-cycle of AC line voltage applied to the thyristor of the proper polarity to sustain conduction.

For controlled bridge rectifiers, either half-control or full-control, and either single-phase or three-phase, there is a cosine relationship between the average DC output voltage and any firing angle selected. For the particular half-control, three-phase bridge shown in FIG. 1, the average output voltage $$V_{DC\ (ave)} = 1 + \cos \alpha/2)\ V_{DC\ (max)}$$

where alpha is the firing angle of the thyristors in the bridge.

In the circuit shown in FIG. 1, the three-phase AC input voltage is received via conductors 10, 12, and 14. The voltage on conductor 10 will be designated "A" phase, of conductor 12 "B phase" and on conductor 14 "C" phase. This three-phase AC input voltage is applied to half-control rectifier 16. Rectifier 16 is a bridge rectifier comprising thyristors 18, 20, and 22 and diodes 24, 26, and 28. Rectifier 16 comprises a controlled converter connected in series with an uncontrolled converter, the three thyristors being the controlled elements and the diodes, the uncontrolled elements. By varying the voltage of the controlled converter from a maximum "adding" voltage to minimum "opposing" voltage, the combined output of the bridge rectifier can be controlled from a maximum to approximately zero.

To adequately control the thyristors in this half-control, three-phase bridge, a firing angle phase range of zero degrees to 180 degrees is required.

The DC output voltage of the bridge is presented at conductors 30 and 32. Conductor 30 is a negative voltage bus and conductor 32 a positive grounded voltage bus.

The load on the bridge is the armature of a DC motor 34. Typical associated circuitry is shown, such as a sensing resistor 36, external contacts, 38 and 40, in series with the armature and external contact 42 and dynamic breaking resistor 44 in parallel with the armature. Diode 46 is connected between conductor 30 and common conductor 32. The diode provides an alternate current path for load current to flow during periods of continuous conduction at large delay firing angles. Also the diode provides bridge operation down to 0 volts. Filter 48, which may be an RC network, is connected across conductors 32 and 30 for eliminating transients thus smoothing the DC output voltage. Shunt field 50 is connected between "C" phase on conductor 14 and the DC output voltage bus conductor 30. This connection provides about an excitation voltage for the motor field. A filter 52, which may be an RC network, may be connected across thyristors 18, 20, and 22 and across diodes 24, 26, and 28. A choke 54 may be utilized in series with the AC input voltage on conductors 10, 12, and 14 for smoothing out variations in this voltage.

Since the relationship between the average DC output voltage of rectifier 16 and the firing angle of the thyristors is a cosine relationship, a cosine wave reference voltage must be used to provide a linear transfer characteristic between the bridge output voltage and a control input to the circuit for firing the thyristors. This type of firing control is sometimes referred to as "AC rider" control. In the embodiment of FIG. 1, a positive DC control voltage is summed with a negative bias signal and a cosine wave. In each cycle of the input AC voltage, the time when the sum is slightly positive with respect to a circuit common determines the firing angle in each cycle.

In the embodiment of FIG. 1, there is shown a firing circuit 60 for thyristors 18, 20, and 22. Firing circuit 60 includes a logic circuit comprising an AC reference circuit 62 and a firing amplifier 64, and also includes a firing amplifier inhibitor circuit. Each AC reference circuit 62 includes the 90° phase-shift circuit 68 and a differential amplifier circuit 70. Each firing circuit 60 also includes a comparator circuit 72.

In each AC reference circuit 62, each phase-shift circuit lags one phase of the three-phase AC input voltage by 90°, and the differential amplifier circuit 70 attenuates, inverts, and level-shifts the output of the phase-shift network to the voltage level of circuit common on conductor 32.

Comparator circuit 72 initiates the generation of a firing pulse when both of its input conditions are met and when enabled by inhibitor circuit 66. Input conditions for comparator circuit 72 to initiate a pulse are met when summation of a DC control voltage, an AC reference voltage, and a bias voltage are slightly positive with respect to circuit common of conductor 32. Inhibitor circuit 66 will enable comparator circuit 72 when a positive voltage (above approximately plus 10 volts) is sensed across a corresponding thyristor. Inhibitor circuit 66 will enable corresponding comparator circuit 72 only when the corresponding thyristor is not conducting.

To provide a firing gate pulse of a certain minimum pulse width, the feedback signal is applied to the input of inhibitor circuit 66 from the output of firing amplifier circuit 64. Unless this feedback signal is utilized, inhibitor circuit 66 will disable comparator circuit 72, which in turn will stop the firing pulse as soon as the conduction of the corresponding thyristor is sensed by inhibitor circuit 66. This is an undesirable condition which can cause thyristor failure.

Should a thyristor cease to conduct before the conduction period of the cycle ends, firing circuit 60 is capable of generating subsequent firing pulses. The thyristor might cease to conduct because of variations in the AC input voltage which reduce the voltage applied across the thyristor to a value below that necessary to sustain conduction.

Figure 2:
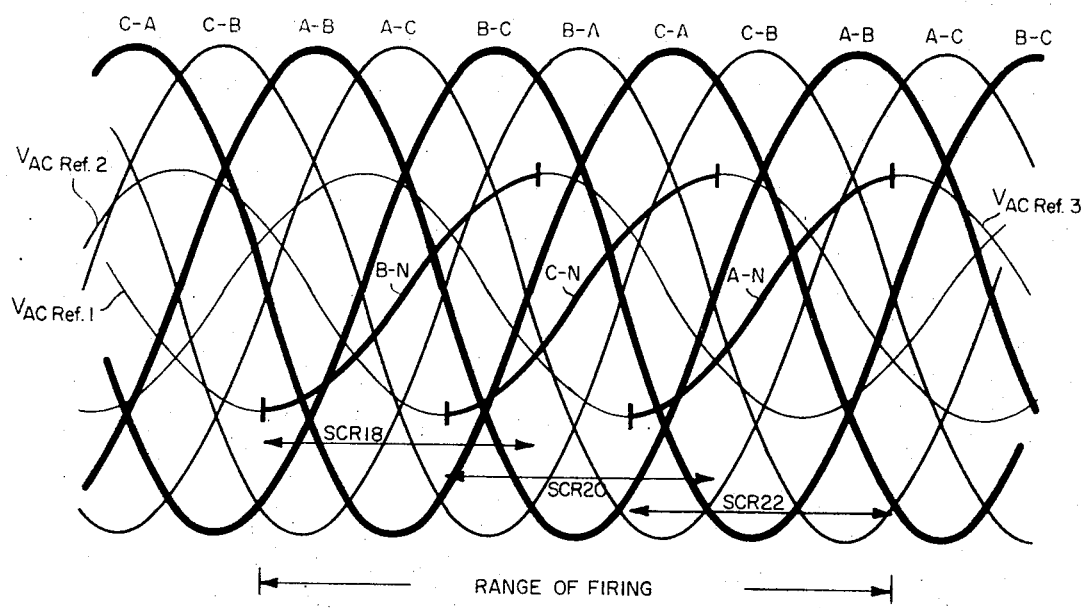
FIG. 2 is a wave form diagram showing relationships between AC reference voltages and AC line-to-line input voltages.

FIG. 2 shows the line to neutral and line-to-line voltages for ABC phase sequence. Also shown are the ranges of the firing angles for thyristors 18, 20, and 22. To control the firing of thyristor 18, for example, a portion of a cosine wave in phase with $V_{B-N}$ may be utilized as an AC reference signal. To generate an AC reference signal in phase with $V_{B-N}$, the line-to-line voltage may be lagged by 90° and inverted. Lagging a line-to-line voltage and inverting it provides additional filtering while utilizing only an RC filter.

AC reference circuit 62 should operate on both 50 parts Hz and 60 Hz operation without adjustment since it operates at the nearly flat portion of the angle versus log frequency curve and by simple RC network.

Consider now the detail circuitry of the embodiment of FIG. 1 in AC phase-shift network 68, line to line voltage $V_{C-A}$ as applied to a phase-shift network comprising resistors 74 and 76 and capacitor 78. This phase-shift network shifts the voltage $V_{C-A}$ by approximately 90° to a voltage substantially in phase with $V_{N-B}$ (not shown) across capacitor 78. This voltage across capacitor 78 is then attenuated, inverted, and level-shifted to the circuit common 32 by differential amplifier 80. Resistors 82 and 84 attenuate the voltage $V_{N-B}$ to an appropriate level for inversion by differential amplifier 80. The input voltages to differential amplifier 80 must be limited to a range which can be accepted by the differential amplifier. The differential amplifier presents an output signal which is a cosine reference signal having an amplitude varying about the circuit common on conductor 32 and of line frequency. Resistor 86 is a feedback resistor for differential amplifier 80. Capacitors 87 and 89 provide additional lag in the output signal to amplifier 80 to compensate for any desired lag not effected by phase-shift network 68. Thus there has been developed at this point an AC reference voltage $V_{B-N}$ having a cosine relationship to the AC input voltage and having a usable range in the preferred embodiment from cosine $\alpha = -1$ for a zero firing angle to cosine $\alpha = +1$ for a 180° firing angle. Resistor 88 shifts the level of the AC reference voltage presented by differential amplifier 80 to the circuit common of conductor 32.

Conductor 90 is a summing point for three voltages, an AC reference voltage coupled by current resistor 92, a DC control voltage coupled from terminal 93 by resistor 94, and a bias voltage coupled from a negative voltage supply by resistor 96. Conductor 90 is connected to the base of transistor 98. The comparator circuits in all three firing circuits 60 are similar except that the comparator circuits 98b and 98c have an additional input which is discussed below. A positive voltage is applied to the collector of transistor 98 through resistors 100, 102, and 103. The base of transistor 98 is used as a summing node for the AC reference voltage, the DC control signal, and the bias signal using current summing resistors 92, 94, and 96, respectively. The DC control voltage applied to terminal 93 is a positive voltage variable from zero to a maximum magnitude of which is proportional to a predetermined firing angle for a corresponding thyristor and proportional to the DC output voltage of rectifier 16. The negative voltage applied to the summing point 90 through resistor 96 shifts the level of the AC reference voltage so that a control voltage of only positive polarity may be used. Assume for the moment that transistor 104 is conducting. Transistor 98 conducts when the sum of the currents at its base becomes slightly positive. Conduction in transistor 98 supplies driving current to firing the base of transistor 106 in firing amplifier circuit 64. The emitter of transistor 106 is connected to the positive voltage supply through resistors 108 and 103.

Conduction through transistor 106 supplies drive current to the base of transistor 114 in firing amplifier circuit 64. The emitter of transistor 114 is connected to a positive voltage supply through resistor 103. When transistor 114 conducts, regenerative current is applied to the base of comparator transistor 98 through a network comprising capacitor 110 and resistor 112. Regenerative current results in a gating pulse having a steep wave front.

The output of transistor 114 is a firing pulse coupled to the gate of a corresponding thyristor by resistor 116. The firing pulse drives the thyristor into conduction at the predetermined firing angle determined by the magnitude of the DC control voltage at terminal 93.

The firing pulse from transistor 114 is also applied to the base of transistor 104 through capacitor 118 and resistor 120. The application of the firing pulse to the base of transistor 104 prevents the firing amplifier inhibitor circuit 66 from prematurely disabling comparator transistor 98.

The firing amplifier inhibitor circuit comprises transistor 104 and associated circuitry. Transistor 104 is connected to sense conduction or non-conduction in a corresponding thyristor 18, 20, or 22. The emitter of transistor 104 is connected to the circuit common of conductor 32. The cathodes of thyristors 18, 20, and 22 are also connected to circuit common, conductor 32. Transistor 104 will conduct whenever it senses a positive voltage (exceeding a few volts) across its corresponding thyristor. A positive voltage drop across a thyristor will only occur when the thyristor is not conducting. Conduction through transistor 104 enables comparator transistor 98 by completing a conduction path from circuit common, conductor 32 to the positive voltage source through transistor 98, resistor 100, resistor 102, and resistor 103. Transistor 98 will then conduct in accordance with its input conditions.

Transistor 104 will cease to conduct whenever its corresponding thyristor is conducting. When its corresponding thyristor is conducting, there is no appreciable voltage drop across it, and therefore no drive voltage is sensed by transistor 104. Turning off transistor 104 disables transistor 98. The disabling of transistor 98 prevents the generation of a firing pulse even if the input condition in transistor 98 is such that a firing pulse would otherwise be generated.

Diode 122 is connected between the gate of the corresponding thyristor and circuit common to protect the thyristor gate from negative voltage. Resistor 124 bypasses any leakage current around its corresponding thyristor gate.

Resistors 130 and 132 comprise a voltage divider network connected between one line of the AC input voltage applied to resistor 76 and circuit common, conductor 32. The voltage applied to resistors 130 and 132 is the voltage across the corresponding thyristor. For example, in firing circuit 60a, the voltage applied to the resistor network is phase "A" of the three-phase input voltage which is also applied across thyristor 18. The voltage at the junction between resistors 130 and 132 and circuit common, conductor 32 is indicative of the state of conduction in the corresponding thyristor. When the corresponding thyristor is non-conducting, a voltage is sensed by the resistor network and applied to the base of transistor 104, causing it to go into conduction. Conduction in transistor 104 enables comparator transistor 98 as discussed above. When the corresponding thyristor is conducting, no voltage is sensed across it, and thus there is not a sufficient voltage at the junction of resistors 130 and 132 to sustain conduction in transistor 104. The turning off of transistor 104 disables comparator transistor 98 as discussed above.

The three firing circuits, 60a, 60b, and 60c, are identical except for circuitry for adjusting tolerance differences between components in the three firing circuits. Circuit 60b has an additional resistor 138 connected between the summing point of comparator transistor 98 and an external variable resistor 140. Variable resistor 140 is connected between the positive and negative voltage supply. The offset level of the output voltage of transistor 98b may be adjusted to compensate for any tolerance differences.

Firing circuit 60c includes an additional resistor 142 similar in purpose to resistor 138. Variable resistor 144 is similar to variable resistor 140.

Variable resistor 146 is a means for supplying a DC control voltage to all three firing circuits. Variable resistor 146 is connected between a positive voltage and circuit common. For the embodiment shown in FIG. 1, the DC control voltage is varied between 0 volts and a maximum positive voltage. The magnitude of the DC control voltage corresponds to a predetermined firing angle for each of the thyristors 18, 20, and 22. For example, a control voltage of 0 volts would correspond to a firing angle of 180° for thyristors 18, 20, and 22 during the half-cycle period of conduction in each of the three thyristors.

Consider now the operation of the circuitry shown in FIG. 1. The operation of firing circuit 60a and its corresponding thyristor 18 will be discussed. The operation of firing circuit 60b and 60c and their respective thyristors 20 and 22 is identical to the operation of firing circuit 60a. Assume that thyristor 18 is non-conducting.

Variable resistor 146 is adjusted to supply a DC control voltage to terminal 93. The DC control voltage is proportional and corresponds to a desired firing angle of thyristors 18, 20, and 22 and to a desired average DC output voltage in conductors 30 and 32 of rectifier 16. Linear control of the firing angle is achieved by summing the DC control voltage to terminal 93 with a cosine reference signal. The cosine reference signal is developed by a phase-shift network 68 and a differential amplifier 80. Phase-shift network 68 lags a line-to-line input voltage $V_{C-A}$ by a substantially 90° to produce a voltage across capacitor 78 substantially in phase with $V_{N-B}$. Differential amplifier 80 and its associated circuitry attenuate the signal across capacitor 78, inverted, and shift the level of this signal to the circuit common appearing on conductor 32.

Transistor 104 in inhibitor circuit 66 enables comparator transistor 98. Since thyristor 18 is not conducting, resistors 130 and 132, connected between phase "A" and circuit common, sense the voltage across thyristor 18 and drive transistor 104 into conduction.

Comparator transistor 98 will now conduct according to its input condition. The DC control signal, the AC reference signal, and a bias signal are added at summing point 90 transistor 98. Assume that a firing angle of 45° has been selected. The DC control voltage is positive and will have a magnitude of 0.853 times the maximum value which maximum represents a firing angle of 0°. From the sum of the DC control voltage, the cosine wave of the AC reference voltage and the bias signal becomes slightly positive, transistor 98 is driven into conduction.

Transistors 106 and 114 are driven into conduction by current flowing through resistor 100 and 102 when transistor 98 conducts. Firing amplifier 64 produces a firing pulse at the desired firing angle.

The firing pulse from firing amplifier 64 is applied to the gate of a corresponding thyristor, for example, thyristor 18 and to the firing amplifier inhibitor circuit 66. The thyristor is gated into conduction. Application of the firing pulse to the base of transistor 104 prevents transistor 104 from disabling the comparator transistor 98 until the thyristor is well into conduction.

The firing pulse generated by firing amplifier 64 has a pulse width dependent upon the time constant of resistor 120 and capacitor 118. The width of the firing pulse is short with respect to the period of conduction of the thyristor. Even though the firing pulse terminates, the thyristor will stay in conduction until the line voltage appearing across it is sufficient to support conduction. Normally, conduction will continue until approximately the end of the half-cycle of the AC line input voltage appearing across the thyristor. The comparator transistor 98 will be inhibited during this period by the firing amplifier inhibitor circuit 66, and no other firing pulses will be generated during the period the thyristor is conducting.

In the event of a disturbance on the line input voltage, such as a severe input line notch, conduction of the thyristor may cease before the end of the half-cycle period of normal conduction. In the event the thyristor does cease to conduct prematurely, the inhibitor circuit 66 will again enable comparator transistor 98 as soon as a sufficient voltage is sensed across the thyristor. A subsequent firing pulse will be generated and the thyristor gated back into conduction in the manner described above. Of course, the thyristor may cease to conduct and be gated back into conduction more than once during the period from the initial first firing pulse at the predetermined firing angle to the end of the half-cycle in the line input voltage of a polarity that will support conduction in the thyristor.

Thyristors 20 and 22 are operated in the manner discussed above for thyristor 18. Thus an average DC output voltage is produced. The average DC output voltage has a magnitude in accordance with the above stated function of the firing angle 45. The speed of motor 34 is proportional to this average DC output voltage.

Figure 4:
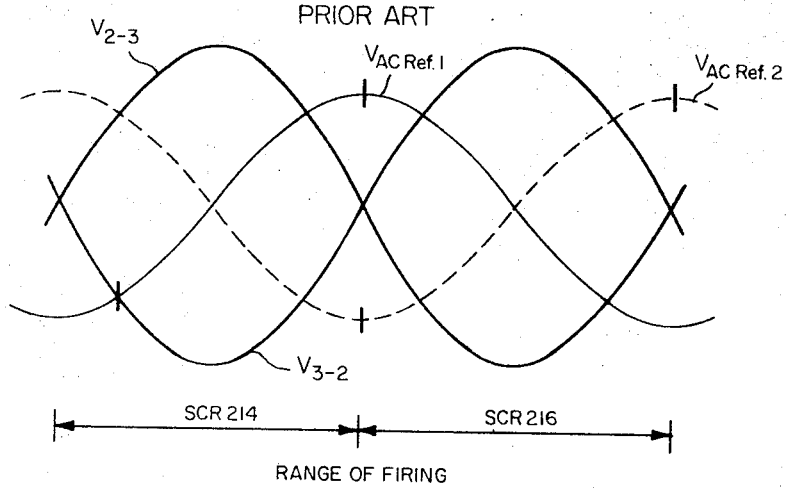
FIG. 4 is a wave form diagram showing the relationship between AC reference voltages and line-to-line input voltages.

In FIG. 3, there is shown another embodiment of the control circuit of the invention which controls the firing angle of thyristors in a single-phase, half-controlled bridge rectifier. Single-phase, half-controlled converters are well known in the art. As in the case of the three-phase bridge converter, the average DC output voltage of the bridge is a cosine function of the firing angle of the thyristors utilized as the controlled elements in the bridge. In FIG. 4 there is shown the AC input line voltage and the phase relationships of reference voltages with respect to line input voltage needed to obtain a voltage having a cosine wave form with respect to the half-cycle of the applied input line voltage which corresponds to the half-cycle of conducting time in a thyristor.

AC reference voltages of the proper phase relationship with respect to the AC input line voltage are produced by firing circuit 200 and firing circuit 202. The input line voltage $F_{AC}$ is applied to terminals 210 and 212. The single-phase, bridge converter 204 comprises a pair of thyristors 214 and 216, a pair of diodes 218 and 220, and a free-wheeling diode 222 which may be utilized with inductive loads on the bridge converter to provide voltage control down to 0 volts.

Bridge rectifier 204 has a circuit common, conductor 228, and presents a negative DC output voltage, the positive output terminal being connected to circuit common.

Firing circuit 200 is very similar to firing circuit 60. AC reference circuit 62, including phase-shift circuit 68, and differential amplifier circuit 80 are identical in purpose and function to AC reference circuit 62 shown in FIG. 1 and discussed above.

Transistor 230 is utilized in an inhibitor circuit which enables and disables comparator transistor 232 in the manner discussed above with regard to transistor 104 and comparator transistor 98a. Transistor 234 is utilized in a firing amplifier circuit having a similar purpose and operation to firing amplifier circuit 64 as shown in FIG. 1 and discussed above.

Comparator transistor 232 has a summing point 236 which sums three input voltages, an AC reference signal, $V_{AC}$ ref. 1 which lags the line input voltage $V_{2-3}$ by 90°, as shown in FIG. 4, a DC control voltage and a negative bias voltage to offset the sum of the control voltage and the reference voltage. The negative bias voltage is applied through resistor 237, the AC reference voltage $V_{AC}$ ref. 1 through resistor 238, and the DC control voltage through resistor 240. Transistor 232 conducts whenever it is enabled by transistor 230 and when summing point 236 becomes slightly positive.

Conduction in transistor 234 transmits a firing pulse to the gate of thyristor 214 thereby causing it to conduct. The firing pulse is also coupled to the base of inhibitor transistor 230 by resistor 254 and capacitor 256. This coupling of the firing pulse to the base of the inhibitor transistor 230 prevents transistor 230 from disabling comparator transistor 232 until thyristor 214 is well into conduction, as discussed in more detail with regard to FIG. 1.

Firing amplifier transistor 234 will generate an initial first gating pulse at the predetermined firing angle for gating its corresponding thyristor into conduction. When the voltage on the base of transistor 230, due to the firing pulse, drops below the value needed to sustain conduction in transistor 230, transistor 230 will cease to conduct and thereby disable transistor 232 terminating the firing pulse. The thyristor will, however, continue to conduct.

Thyristor 214 will continue to conduct until the end of the half-cycle of applied line voltage for the proper polarity for conduction. Assume that the applied line voltage across thyristor 214 drops below a value necessary to sustain conduction due to a severe line notch. Resistor 264 senses the voltage applied across a corresponding thyristor. When the thyristor is not conducting and the voltage across it rises above a certain value, the voltage drop sensed by resistor 264 will drive transistor 230 into conduction, thus enabling comparator transistor 232 and permitting a subsequent firing pulse after the first firing pulse at the predetermined firing angle and before the end of the half-cycle of applied line voltage of the proper polarity for conduction of the thyristor.

Firing circuit 202 is similar to firing circuit 200 with one exception. In FIG. 4 can be seen that the AC reference voltage necessary for linear control of thyristor 216 is a cosine wave form, $V_{AC}$ ref. 2, which lags the voltage applied across thyristor 216 by 90° and which is 180° out of phase with $V_{AC}$ ref. 1. In the circuit shown in FIG. 3, the voltage $V_{AC}$ ref. 2 is obtained by inverting the output voltage from amplifier 80 inverting amplifier 268. The output voltage from amplifier 80 is the voltage $V_{AC}$ ref. 1. The output voltage from amplifier 268 is then applied to the summing point of comparator transistor 232. Comparator transistor 232 functions in the manner discussed above with regard to firing circuit 200.

The only other difference between firing circuit 202 and firing circuit 200 is the connection of sensing resistor 264 to the AC line voltage applied to the other thyristor 216. Firing circuit 202 prevents firing pulses at terminal 278 which is connected to the gate of thyristor 216.

I claim:

1. A circuit comprising:
   a. a switching circuit connected to receive an AC input voltage, said switching circuit having at least one grid-controlled means for rectifying an AC signal connected in circuit and having a pair of output terminals for presenting a DC output signal, the duty cycle of the DC output signal being controlled at a selectively variable predetermined firing angle of said grid-controlled rectifying means;
   b. a logic circuit means for controlling the firing angle of said rectifying means during each cycle of said AC voltage, said logic circuit means being phase-referenced to said AC signal, said logic circuit means adapted to generate gating pulses having a predetermined pulse width, said logic circuit generating a first gating pulse at a selectively variable firing angle in each cycle of the AC voltage, said first gating pulse coupled to gate said grid-controlled rectifying means into conduction; and
   c. an inhibitor circuit means having an input coupled to said grid-controlled rectifying means for monitoring the state of conduction in said grid-controlled rectifying means and having an output coupled to said logic circuit means for enabling said logic circuit whenever said rectifying means is not conducting and for disabling said logic circuit means beginning a predetermined time from each firing of said rectifying means by each gating pulse in each cycle, said logic circuit means generating a subsequent gating pulse after said first gating pulse in each said cycle whenever said logic circuit means is enabled by said inhibitor circuit means, each subsequent gating pulse gating said grid-controlled rectifying means into conduction.

2. The device as claimed in claim 1 wherein said switching circuit comprises a rectifier circuit, and said logic circuit means comprises an AC reference circuit means, a means for supplying a controlled voltage and a comparator circuit, said AC reference circuit means coupled to receive the AC voltage for producing an AC reference voltage shifted in phase from said AC voltage by a predetermined angle, the control voltage being selectively variable and corresponding to a predetermined angle with respect to a cycle of the AC voltage, said comparator circuit means having an input coupled to said means for supplying a control voltage to receive said control voltage, said comparator circuit means summing said AC reference voltage and said control voltage to generate said first gating pulse at a predetermined angle with respect to a cycle of the AC voltage, said rectifier circuit presenting a DC output voltage, the magnitude of the DC output voltage being proportional to the firing angle of said grid-controlled rectifying means.

3. The devices claimed in claim 2 wherein said rectifier circuit comprises a half-controlled, single-phase bridge rectifier circuit.

4. The devices claimed in claim 2 wherein said rectifier circuit comprises a half-controlled, three-phase bridge rectifier circuit.

5. A speed-controlled DC motor comprising:
   a. a DC motor;
   b. a rectifier circuit connected to receive an AC input voltage, said rectifier circuit having at least one grid-controlled means for rectifying an AC voltage connected in circuit and having a pair of output terminals for presenting a DC output voltage, the magnitude of the DC output voltage being proportional to the firing angle of said grid-controlled rectifying means, said DC output voltage coupled to the armature of said DC motor, the speed of said DC motor being proportional to the magnitude of said DC output voltage;
   c. a logic circuit means for controlling the firing angle of said rectifying means during each cycle of said AC input voltage, said logic circuit means being phase-referenced to said AC input signal, said logic circuit means adapted to generate gating pulses having a predetermined pulse width, said logic circuit means generating a first gating pulse at a selectively variable firing angle in each cycle of the AC input voltage, said first gating pulse coupled to gate said grid-controlled rectifying means into conduction; and
   d. an inhibitor circuit means having an input coupled to said grid-controlled rectifying means for monitoring the state of conduction in said grid-controlled rectifying means and having an output coupled to said logic circuit means for enabling said logic circuit means whenever said rectifying means is not conducting and for disabling said logic circuit means, said inhibitor circuit means disabling said logic circuit means beginning a predetermined time from each firing of said rectifying means by each gating pulse in each cycle, said logic circuit generating a subsequent gating pulse after said first gating pulse in each said cycle whenever said logic circuit is enabled by said inhibitor circuit, each subsequent gating pulse gating said grid-controlled rectifying means into conduction.

* * * * *